(12) United States Patent
Tai et al.

(10) Patent No.: US 10,882,963 B2
(45) Date of Patent: Jan. 5, 2021

(54) PROCESSES FOR PRODUCING CHLORINE-CONTAINING RESIN COMPOSITION AND PROCESSED CHLORINE-CONTAINING-RESIN OBJECT

(71) Applicant: Sakai Chemical Industry Co., Ltd., Sakai (JP)

(72) Inventors: Yasuhiro Tai, Osaka (JP); Koichi Tsuda, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 16 days.

(21) Appl. No.: 16/307,368

(22) PCT Filed: Jun. 16, 2017

(86) PCT No.: PCT/JP2017/022297
§ 371 (c)(1),
(2) Date: Dec. 5, 2018

(87) PCT Pub. No.: WO2018/029984
PCT Pub. Date: Feb. 15, 2018

(65) Prior Publication Data
US 2019/0345297 A1    Nov. 14, 2019

(30) Foreign Application Priority Data

Aug. 8, 2016    (JP) ................. 2016-155691

(51) Int. Cl.
| | | |
|---|---|---|
| *C08L 27/06* | (2006.01) | |
| *C08K 9/04* | (2006.01) | |
| *B29D 7/01* | (2006.01) | |
| *C08J 3/20* | (2006.01) | |
| *B29C 48/00* | (2019.01) | |
| *C08K 3/26* | (2006.01) | |
| *C08K 5/09* | (2006.01) | |
| *C08K 5/5419* | (2006.01) | |
| *B29K 27/00* | (2006.01) | |
| *B29K 105/00* | (2006.01) | |
| *C08J 5/18* | (2006.01) | |
| *C08K 9/12* | (2006.01) | |

(52) U.S. Cl.
CPC ............. *C08J 3/203* (2013.01); *B29C 48/022* (2019.02); *C08K 3/26* (2013.01); *C08K 5/09* (2013.01); *C08K 5/5419* (2013.01); *C08L 27/06* (2013.01); *B29D 7/01* (2013.01); *B29K 2027/08* (2013.01); *B29K 2105/0044* (2013.01); *C08J 5/18* (2013.01); *C08J 2327/06* (2013.01); *C08J 2427/06* (2013.01); *C08K 9/04* (2013.01); *C08K 9/12* (2013.01); *C08K 2201/00* (2013.01)

(58) Field of Classification Search
None
See application file for complete search history.

(56) References Cited

U.S. PATENT DOCUMENTS

| | | | | |
|---|---|---|---|---|
| 3,829,398 | A | * | 8/1974 | Ogawa .................. C08K 5/103 523/100 |
| 6,413,639 | B1 | * | 7/2002 | Kobayashi ............... C08K 9/04 427/220 |
| 2012/0228539 | A1 | * | 9/2012 | Honmyo ................. C01G 9/006 252/62 |

FOREIGN PATENT DOCUMENTS

| | | |
|---|---|---|
| EP | 1 088 853 | 4/2001 |
| EP | 1 803 685 | 7/2007 |
| EP | 2 471 862 | 7/2012 |
| JP | 63-020343 | 1/1988 |
| JP | 09-278952 | 10/1997 |
| JP | 2001-040217 | 2/2001 |
| JP | 2001-164042 | 6/2001 |
| JP | 2001-261907 | 9/2001 |
| JP | 2004-299931 | 10/2004 |
| JP | 2006-023351 | 1/2006 |
| JP | 2006-184687 | 7/2006 |
| JP | 2011-068877 | 4/2011 |
| JP | 2012-167232 | 9/2012 |

* cited by examiner

*Primary Examiner* — Richard A Huhn
(74) *Attorney, Agent, or Firm* — Hamre, Schumann, Mueller & Larson, P.C.

(57) ABSTRACT

The present invention aims to provide a method for producing a chlorine-containing resin composition and a method for producing a chlorine-containing resin processed product, the methods being capable of providing a processed product that is excellent in thermal stability and heat resistance and that has various excellent properties derived from the chlorine-containing resin in an efficient, easy, simple, and high-yield manner, without degrading the appearance of the processed product. The present invention provides a method for producing a chlorine-containing resin composition, including: step (I) of dry-mixing a silicone oil and/or a liquid fatty acid having a C12 or higher carbon chain with a hydrotalcite powder to obtain a mixture; and step (II) of further mixing a chlorine-containing resin with the mixture.

7 Claims, No Drawings

PROCESSES FOR PRODUCING CHLORINE-CONTAINING RESIN COMPOSITION AND PROCESSED CHLORINE-CONTAINING-RESIN OBJECT

TECHNICAL FIELD

The present invention relates to methods for producing a chlorine-containing resin composition and methods for producing a chlorine-containing resin processed product.

BACKGROUND ART

Chlorine-containing resins such as polyvinyl chloride are highly flexible and easily processable, and also have properties such as flame retardancy. Thus, such resins are used in various applications such as agricultural films, electric wires, pipes, and resin window frames. Yet, the chlorine-containing resins, which unfortunately have poor thermal stability, are unstable to heat during processing or use, and degraded when heated. Thus, use of a chlorine-containing resin in combination with a stabilizer has been studied. Patent Literature 1 suggests hydrotalcite as an exemplary stabilizer.

Meanwhile, hydrotalcite is also used as a heat retaining agent for agricultural films. For example, Patent Literature 2 discloses a hydrotalcite powder having an oil absorption in a predetermined range and an oil absorption/plate surface diameter ratio in a predetermined range. This hydrotalcite particulate powder has excellent heat retention properties and is useful as a heat retaining agent for agricultural films.

CITATION LIST

Patent Literature

Patent Literature 1: JP 2001-261907 A
Patent Literature 2: JP 2011-68877 A

SUMMARY OF INVENTION

Technical Problem

As described above, Patent Literature 1 suggests hydrotalcite as a stabilizer to be added to chlorine-containing resins. Yet, the inventors of the present invention found that when producing a product by processing (or molding) a resin composition containing a chlorine-containing resin and hydrotalcite, plate-out (a phenomenon in which a resin composition is deposited on a die, mold, cooling mold, or the like) occurs frequently. Although no plate-out is found for a while after processing has started, it occurs within a few minutes at the earliest, and then the amount of deposition increases over time. The occurrence of plate-out unfortunately degrades the appearance of the resulting product (e.g., reduced luster, occurrence of cracks and/or streaks) or physical properties (e.g., reduced impact strength). The occurrence of plate-out also causes problems in terms of facilities and workability because it requires washing of a die, mold, or cooling mold for removal of plated-out materials.

Patent Literature 2 describes mixing hydrotalcite with polyolefin resin to obtain a masterbatch. Yet, the processing time described in the examples is short (about five minutes), and Patent Literature 2 is silent about phenomena or problems associated with prolonged processing of a masterbatch. Patent Literature 2 is also silent about use of hydrotalcite in combination with a chlorine-containing resin, and is completely unaware of a problem that occurs when hydrotalcite is used in combination with a chlorine-containing resin.

The present invention was made in view of the current situation described above, and aims to provide a method for producing a chlorine-containing resin composition and a method for producing a chlorine-containing resin processed product, the methods being capable of providing a processed product that is excellent in thermal stability and heat resistance and that has various excellent properties derived from the chlorine-containing resin in an efficient, easy, simple, and high-yield manner, without degrading the appearance of the processed product.

Solution to Problem

The present inventors found that when chlorine-containing resin and hydrotalcite particles are used in combination to obtain a processed product, plate-out may occur during processing, while the resulting processed product (also referred to as an article or a product) has thermal stability. As described above, the occurrence of plate-out degrades the appearance or physical properties of the processed product, and also requires washing of instruments or devices. The present inventors keenly examined the cause of plate-out. They preliminarily dry-mixed a silicone oil and/or a specific liquid fatty acid with a hydrotalcite powder, and then mixed the mixture with a chlorine-containing resin for processing. As a result, they found that it is possible to sufficiently prevent the occurrence of plate-out for a long period of time after the processing has started. They also found that use of such a hydrotalcite powder also prevents degradation of the appearance or physical properties, and enables high-yield production of a processed product that has a good color tone, transparency, and desired excellent physical properties. In addition, washing of a die, mold, or cooling mold, which is associated with the occurrence of plate-out, can be omitted or simplified. This improves product productivity, which is industrially advantageous. The present inventors also found that an additional use of organic acid zinc as a raw material can further prevent discoloration of the processed product during production and use, for example. Thus, the problems described above were successfully solved, and the present invention was completed.

Specifically, the present invention provides a method for producing a chlorine-containing resin composition, including: step (I) of dry-mixing a silicone oil and/or a liquid fatty acid having a C12 or higher carbon chain with a hydrotalcite powder; and step (II) of further mixing a chlorine-containing resin with the mixture.

Preferably, the mixture obtained in step (I) has an oil absorption of 50 ml/100 g or less. This allows the present invention to achieve a higher plate-out preventing effect.

Preferably, the mixture obtained in step (I) has a bulk density of 0.33 g/ml or more. A bulk density of 0.33 g/ml or more furthers increase the plate-out preventing effect.

Preferably, in step (I), the amount of the silicone oil and/or the liquid fatty acid, or the total amount when two or more silicone oils and/or two or more liquid fatty acids are used, is 1 to 30 parts by mass relative to 100 parts by mass of the hydrotalcite powder. This allows the present invention to achieve a higher plate-out preventing effect.

Preferably, the hydrotalcite powder contains magnesium (Mg) and/or zinc (Zn), and aluminum (Al). This enhances the thermal stability and heat resistance of the processed product, and can also sufficiently prevent plate-out.

The present invention also provides a method for producing a chlorine-containing resin processed product, including a step of processing the chlorine-containing resin composition obtained by the above production method.

Preferably, the processing step is an extruding step. This allows the present invention to achieve a higher plate-out preventing effect.

Advantageous Effects of Invention

Since the methods for producing a chlorine-containing resin composition and a chlorine-containing processed product of the present invention have features as described above, the methods can each provide a processed product that is excellent in thermal stability and heat resistance and that has various excellent properties derived from the chlorine-containing resin in an efficient, easy, simple, and high-yield manner, without degrading the appearance of the processed product. Such production methods are industrially advantageous because washing of a die, mold, or cooling mold, which is associated with the occurrence of plate-out, can be omitted or simplified.

DESCRIPTION OF EMBODIMENTS

Preferred embodiments of the present invention are specifically described below. The present invention is not limited to these embodiments, and suitable modifications may be made without departing from the gist of the present invention.

1. Method for Producing Chlorine-Containing Resin Composition

First, a method for producing a chlorine-containing resin composition according to a first aspect of the present invention is described.

The method for producing a chlorine-containing resin composition (also simply referred to as a "resin composition") of the present invention includes step (I) of dry-mixing a silicone oil and/or a liquid fatty acid having a C12 or higher carbon chain with a hydrotalcite powder to obtain a mixture; and step (II) of further mixing a chlorine-containing resin with the mixture. The method may further include one or more additional steps that are used in the production of usual resin compositions.

<Step (I)>

Step (I) is a step of dry-mixing a silicone oil and/or a liquid fatty acid having a C12 or higher carbon chain with a hydrotalcite powder. Any mixing method may be used as long as it is dry-mixing. For example, mixing using a Henschel mixer or a super mixer is preferred.

Raw materials to be used in step (I) are described below.

Hydrotalcite Powder

Any hydrotalcite powder may be used as long as it has hydrotalcite structure. The hydrotalcite powder preferably contains magnesium (Mg) and/or zinc (Zn), and aluminum (Al). This enhances the thermal stability and heat resistance of the processed product, and can also sufficiently prevent plate-out. In particular, in order to achieve a higher plate-out preventing effect, preferably, the molar ratio of the total amount of magnesium and zinc to the amount of aluminum ((Mg+Zn)/Al) is preferably 2.20 or less. The molar ratio is more preferably 2.15 or less, still more preferably 2.10 or less, particularly preferably 2.05 or less. The lower limit is not particularly limited, but it is preferably 1.9 or higher, more preferably 2.0 or higher.

The hydrotalcite powder is particularly preferably represented by the following formula (1):

$$\{(Mg)_x(Zn)_y\}(Al)_z(OH)_2(A^{n-})_{z/n} \cdot mH_2O \qquad (1)$$

wherein $A^{n-}$ represents an n-valent interlayer anion; x, y, and z are numbers that satisfy $0<x<1$, $0<y<1$, $0.2\leq z\leq 0.4$, and $x+y+z=1$; and n and m are numbers that satisfy $1\leq n\leq 4$ and $0\leq m$, respectively. This enhances heat resistance and thermal stability.

In the formula (1), the n-valent interlayer anion is not particularly limited. Yet, in view of reactivity and environmental load reduction, the n-valent interlayer anion is preferably at least one selected from the group consisting of a hydroxide ion ($OH^-$), a carbonate ion ($CO_3^{2-}$), and a sulfate ion ($SO_4^{2-}$). A carbonate ion is preferred among these.

The letters x, y, and z are numbers that satisfy $0<x<1$, $0\leq y<1$, $0.2\leq z\leq 0.4$, and $x+y+z=1$.

Here, the hydrotalcite in which y=0 is referred to as Mg/Al hydrotalcite, and the hydrotalcite in which $0<y$ is also referred to as zinc-modified hydrotalcite. Either of these can be suitably used in the present invention.

The ratio of x+y to z, i.e., $(x+y)/z$, is preferably 2.20 or less. The ratio is more preferably 2.15 or less, still more preferably 2.10 or less, particularly preferably 2.05 or less. The lower limit is not particularly limited, but it is preferably 1.9 or higher, more preferably 2.0 or higher.

The letter n is a number that satisfies $1\leq n\leq 4$, and the number can be suitably adjusted depending on the valence of the interlayer anion. Preferably, n is an integer of 1 to 3, with 2 being more preferred.

The shape of particles of the hydrotalcite powder is not particularly limited. Examples include tabular, spherical, and discoidal shapes. Among these, tabular and discoidal shapes are preferred.

The shape of the particles can be observed with a scanning electron microscope or the like.

The average particle size of the hydrotalcite powder is preferably 0.1 μm or more and 2.0 μm or less, for example. This improves dispersibility of the hydrotalcite powder in the chlorine-containing resin, further improving the effects of the present invention. The average particle size is more preferably 0.3 μm or more, and is more preferably 1.5 μm or less.

Herein, the average particle size can be measured as D50 using, for example, a laser diffraction particle size distribution measuring device (LA950 available from HORIBA).

D50 refers to a median particle size (50% point) of a volume-based cumulative distribution. It is a particle size that splits the distribution of particles with half above and half below this diameter. Specifically, D50 is determined by the following method.

(D50 Measurement Method)

A sample (sample powder) (0.1 g) is mixed with a 0.025 wt % (% by mass) aqueous solution of sodium hexametaphosphate (60 mL). The mixture is dispersed using an ultrasonic homogenizer (US-600 available from Nissei Corporation) at V-level 3 for two minutes. Thus, a sample suspension is prepared. Subsequently, a 0.025 wt % aqueous solution of sodium hexametaphosphate is circulated through a sample circulator, and the suspension is dropped thereto such that the transmittance is 80 to 95%. The mixture is ultrasonically dispersed at a circulation speed of 5 and a stirring speed of 1 for 60 seconds. Then, the measurement is performed.

The specific surface area (also referred to as "SSA") of the hydrotalcite powder is preferably 1 $m^2/g$ or more and 50 $m^2/g$ or less, for example. This improves the dispersibility of the hydrotalcite powder in the chlorine-containing resin, further improving the effects of the present invention. The specific surface area is more preferably 5 m²/g or more, still more preferably 10 m²/g or more. At the same time, the specific surface area is more preferably 40 m²/g or less, still more preferably 30 m²/g or less.

Herein, the specific surface area refers to the BET specific surface area (also referred to as "SSA") determined by the BET method. The BET method is a gas adsorption method in which gaseous particles such as nitrogen are adsorbed onto solid particles, and the specific surface area is measured from the amount of the gaseous particles adsorbed. The specific surface area is determined by calculating the molar volume of the adsorbate VM by the BET method from the relationship between the pressure P and the adsorption volume V.

Specifically, the BET specific surface area is determined under the following conditions.
(Specific Surface Area Measuring Conditions)
Device used: Macsorb Model HM-1220 available from Mountech Co., Ltd.
Atmosphere: Nitrogen gas ($N_2$)
Degassing conditions of external degasser: 105° C. for 15 minutes
Degassing conditions of specific surface area measuring device: 105° C. for 5 minutes
Silicone Oil Any silicone oil may be used. Preferred examples include methylhydrogenpolysiloxanes; dimethylpolysiloxanes; methylhydrogenpolysiloxane-dimethylpolysiloxane copolymers; organopolysiloxanes having a reactive trialkoxysilyl group such as a trimethoxysilyl group or a triethoxysilyl group; methyl phenyl silicones; amino-modified silicones; and coupling agents such as silane coupling agents.
Liquid Fatty Acid In the term "liquid fatty acid having a C12 or higher carbon chain"(also simply referred to as "liquid fatty acid"), the "liquid" means that the fatty acid is liquid at a temperature in the range of 0° C. to 35° C.

The liquid fatty acid has a C12 or higher carbon chain. In order to further improve the plate-out preventing effect, the carbon number of the carbon chain is preferably 14 or larger, more preferably 16 or larger. The upper limit is not particularly limited, but it is preferably 30 at most, more preferably 28 at most. The carbon chain may be linear, branched, or cyclic, but in particular, a linear or branched carbon chain is preferred. It may be a saturated fatty acid carbon chain or an unsaturated fatty acid carbon chain.

Specific preferred examples of the liquid fatty acid include coconut oil fatty acid, palm oil fatty acid, isostearic acid, ricinoleic acid, linoleic acid, linolenic acid, and oleic acid.

Preferably, in step (I), the amount of the silicone oil and/or the liquid fatty acid, or the total amount when two or more silicone oils and/or two or more liquid fatty acids are used, is 1 to 30 parts by mass relative to 100 parts by mass of the hydrotalcite powder. This allows the present invention to achieve a higher plate-out preventing effect. In particular, when one or more silicone oils are used, the above amount is more preferably 20 to 30 parts by mass; whereas when one or more liquid fatty acids are used, the above amount is more preferably 10 to 20 parts by mass.

Preferably, the mixture (powder) obtained in step (I) has an oil absorption of 50 ml/100 g or less. An oil absorption of 50 ml/100 g or less allows the present invention to achieve a higher plate-out preventing effect. The lower limit is not particularly limited, but in terms of heat resistance, the lower limit is preferably at least 5 ml/100 g or more, more preferably at least 10 ml/100 g.

Herein, the oil absorption of the hydrotalcite powder is measured in accordance with JIS K 5101-13-1 (2004: Refined linseed oil method).

Preferably, the mixture (powder) obtained in step (I) has a bulk density of 0.33 g/ml or more. A bulk density of 0.33 g/ml or more further increases the plate-out preventing effect. The bulk density is more preferably 0.35 g/ml or more, still more preferably 0.40 g/ml or more.

Herein, the bulk density is measured in accordance with JIS K6720-2 (1999: Plastics—Homopolymer and copolymer resins of vinyl chloride (PVC)).
<Step (II)>

Step (II) is a step of further mixing a chlorine-containing resin with the mixture obtained in step (I). The mixing method is not particularly limited, but dry mixing is preferred. Specifically, mixing using a Henschel mixer or a super mixer is preferred, for example.

Step (II) may involve mixing one or more additional components other than the mixture obtained in step (I) and the chlorine-containing resin, if necessary. In other words, the chlorine-containing resin composition obtained by the production method of the present invention may further contain one or more additional components. Each component may include one or more components.

Each component is described below.
Chlorine-Containing Resin

The chlorine-containing resin is not particularly limited as long as it is a resin containing a chlorine atom (polymer), but a vinyl chloride resin is preferred to enable production of a processed product having excellent flexibility and flame retardancy.

Examples of the vinyl chloride resin include homopolymers such as polyvinyl chloride, chlorinated polyvinyl chloride, polyvinylidene chloride, and chlorinated polyethylene; and copolymers such as vinyl chloride-vinyl acetate copolymers, vinyl chloride-ethylene-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-urethane copolymers, vinyl chloride-acrylic acid ester copolymers, vinyl chloride-styrene-maleic anhydride copolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate copolymers, vinyl chloride-maleic acid ester copolymers, vinyl chloride-methacrylic acid ester copolymers, vinyl chloride-acrylonitrile copolymers, and vinyl chloride-maleimide copolymers.

A blended product of chlorine-containing resin and chlorine-free resin may also be used. The polymerization method to obtain the vinyl chloride resin is not particularly limited.

In the present invention, the amount of each component is preferably set such that the amount of the hydrotalcite powder after being mixed with the silicone oil(s) and/or the liquid fatty acid(s) (i.e., the total amount of the silicone oil(s), the liquid fatty acid(s), and the hydrotalcite powder) is 0.05 parts by mass or more and 10 parts by mass or less relative to 100 parts by mass of the chlorine-containing resin. This enhances heat resistance and thermal stability. The amount is more preferably 0.1 parts by mass or more and is more preferably 8 parts by mass or less, still more preferably 5 parts by mass or less.
Organic Acid Zinc Preferably, step (II) involves further mixing organic acid zinc. In other words, preferably, the resin composition further contains organic acid zinc. This stabilizes chlorine in the chlorine-containing resin, and prevents discoloration during processing or use. Thus, a processed product can be obtained without further degrading its appearance.

The organic acid to form the organic acid zinc is not particularly limited. Examples include organic monocarboxylic acids such as acetic acid, propionic acid, butyric acid, valeric acid, caproic acid, enanthic acid, caprylic acid, pelargonic acid, 2-ethylhexyl acid, neodecanoic acid, capric acid, undecanoic acid, lauric acid, tridecanoic acid, myristic acid, palmitic acid, isostearic acid, stearic acid, 12-hydroxystearic acid, behenic acid, montanic acid, benzoic acid, monochlorobenzoic acid, p-t-butylbenzoic acid, dimethylhydroxybenzoic acid, 3,5-di-t-butyl-4-hydroxybenzoic acid, toluic acid, dimethylbenzoic acid, ethylbenzoic acid, cuminic acid, n-propylbenzoic acid, aminobenzoic acid, N,N-dimethylaminobenzoic acid, acetoxybenzoic acid, salicylic acid, p-t-octylsalicylic acid, elaidic acid, oleic acid, linoleic acid, linolenic acid, thioglycolic acid, mercaptopropionic acid, and octylmercaptopropionic acid; organic dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, methaconic acid, itaconic acid, aconitic acid, and thiodipropionic acid; and monoesters or monoamides of organic dicarboxylic acids, and di- or tri-esters of organic tri-or tetracarboxylic acids such as butanetricarboxylic acid, butanetetracarboxylic acid, hemimellitic acid, trimellitic acid, mellophanic acid, and pyromellitic acid. In particular, C12-C20 higher fatty acids are preferred. Specifically, for example, zinc salts of myristic acid, palmitic acid, isostearic acid, and stearic acid, which provide adequate lubricity and are compatible with the chlorine-containing resin, are preferred. In particular, zinc salts such as zinc palmitate and zinc stearate are preferably used because they are inexpensive and easily available.

The amount of the organic acid zinc is not particularly limited. For example, the amount is preferably 0.01 parts by mass or more relative to 100 parts by mass of the chlorine-containing resin. This can further prevent discoloration. The amount is more preferably 0.1 parts by mass or more, and is preferably 5 parts by mass or less. This can enhance heat resistance and provide a better color tone, without further degrading the appearance of the resulting product. The amount is more preferably 2 parts by mass or less.

Filler

Preferably, step (II) also involves further mixing a filler. This improves the dimensional stability and strength of the resulting article. Thus, the resulting resin composition is suitable for processed products. The filler also serves as a neutralizer.

The filler is not particularly limited. Any of inorganic salts, inorganic oxide particles, inorganic hydroxide particles, and like other inorganic powders can be used. Examples include salts, oxides, hydroxides, and composite oxides of zinc, titanium, iron, cerium, barium, calcium, silicon, aluminum, magnesium, strontium, boron, and zirconium. The salts are not particularly limited. Examples include sulfate, carbonate, chloride, acetate, and nitrate. Specific examples include calcium carbonate, zinc carbonate, magnesium carbonate, silica, zinc oxide, titanium oxide, cerium oxide, iron oxide, barium sulfate, strontium sulfate, magnesium sulfate, silicon oxide, aluminum oxide, magnesium oxide, zinc silicate, zinc titanate, barium titanate, and talc. Calcium carbonate is preferred among these.

Calcium carbonate is preferably one having a specific surface area (BET specific surface area) of 23 $m^2/g$ or less. The BET specific surface area is more preferably 20 $m^2/g$ or less, still more preferably 18 $m^2/g$ or less. The lower limit is preferably at least 0.1 $m^2/g$. The lower limit is more preferably at least 5 $m^2/g$.

The amount of the filler, when used, is not particularly limited. For example, the amount is preferably 40 parts by mass or less relative to 100 parts by mass of the chlorine-containing resin. If the amount exceeds 40 parts by mass, plate-out may not be prevented. The amount is more preferably 30 parts by mass or less, still more preferably 1 to 30 parts by mass. The amount is still more preferably 25 parts by mass or less, yet still more preferably 20 parts by mass or less, particularly preferably 10 parts by mass or less. The lower limit is preferably at least 1 part by mass, more preferably at least 2 parts by mass, still more preferably at least 3 parts by mass. Most preferably, calcium carbonate having a specific surface area of 20 $m^2/g$ or less is contained in an amount in one of these preferred ranges.

β-Diketone Compound

Preferably, step (II) also involves further mixing a β-diketone compound. This can improve colorability during molding (processing).

The β-diketone compound is not particularly limited. Preferred examples include alkanoylaroylmethane, and diaroylmethane such as stearoylacetylmethane, benzoylacetylmethane, dibenzoylmethane, stearoylbenzoylmethane, octylbenzoylmethane, bis(4-octylbenzoyl)methane, 4-methoxybenzoylbenzoylmethane, bis(4-carboxymethylbenzoyl)methane, 2-carboxymethylbenzoylacetyloctylmethane, and 2-benzoylcyclohexane.

The amount of the β-diketone compound, when used, is not particularly limited. For example, the amount is preferably 2 parts by mass or less relative to 100 parts by mass of the chlorine-containing resin. The amount is more preferably 0.1 to 1 part by mass.

Wax

Step (II) may involve mixing a hydrocarbon wax (such as a polyethylene wax or a paraffin wax) and/or a fatty acid ester wax, if necessary, in order to control the kneading state of resin during processing and for adjusting the appearance (such as luster) of the resulting article. Specific examples of the polyethylene wax include HI-WAX series available from Mitsui Chemicals, Inc., SANWAX series available from Sanyo Chemical Industries, Ltd., VISCOL series available from Sanyo Chemical Industries, Ltd., and LUVAX series available from Nippon Seiro Co., Ltd. Examples of the ester wax include Rikester series available from Riken Vitamin Co., Ltd., and LOXIOL series available from Emery Oleochemicals.

Additional Components

Step (II) may also involve mixing additional components, if necessary. Examples include various additives such as heat resistance aids, lubricants other than the wax mentioned above (e.g., internal lubricants such as fatty acid monoglyceride), ultraviolet light absorbers, antioxidants, crosslinking aids, and plasticizers. These additives are each not particularly limited. For example, the heat resistance aids include polyhydric alcohol compounds such as dipentaerythritol and epoxy compounds such as epoxy resin; the lubricants include monoglyceride stearate, monoglyceride palmitate, stearic acid, and palmitic acid; the crosslinking aids include trimethylolpropane trimethacrylate and dipentaerythritol hexaacrylate; and the plasticizers include dioctyl phthalate (DOP), trioctyltrimellitate (TOTM), and dioctyl adipate (DOA).

2. Method for Producing Chlorine-Containing Resin Processed Product

Next, a method for producing a chlorine-containing resin processed product according a second aspect of the present invention is described.

The method for producing a chlorine-containing resin processed product of the present invention (also simply referred to as "processed product") includes a step (also referred to as "processing step") of processing the chlorine-containing resin composition obtained by the production method according to the first aspect of the present invention described above. In other words, the method for producing a processed product of the present invention includes step (I), step (II), and the processing step described above. The chlorine-containing resin composition may be produced and processed at the same time. The method may further include one or more additional steps, which are employed during production of usual processed products.

<Processing Step>

The processing step is a step of processing the resin composition. The processing method is not particularly limited. Examples include extrusion, injection molding, roll forming, dip molding, and blow molding. Among these methods, extrusion is suitable. This allows the present invention to achieve a higher plate-out preventing effect. In other words, the processing step is preferably an extruding step, and a processed product that can be obtained by the production method of the present invention is preferably an extruded product (extrudate). The extrusion (extrusion molding) is preferably accomplished by an extruder.

Here, among extrudates, the production method of the present invention is particularly effective in processing of products called profile extrudates (such as window frames) that have particularly complicated shapes and that are difficult to produce. Dies for use in profile extrusion have complicated shapes, and plate-out thus easily occurs. As a result, the incidence of defective processed products is generally high, and resin is susceptible to discoloration and/or degradation during processing. Thus, use of the present invention is promising in increasing the extrudate yield. An embodiment of the production method of the present invention, which is a method for producing a profile extrudate, is one of preferred embodiments of the present invention.

In the case of extrusion, an increase in frequency of use of a die is known to cause various defects due to degradation of portions where the die contacts resin. For example, red streaks may occur when a die is used at 160° C. to 220° C. for a cumulative time of 3000 hours or longer. Use of the present invention is promising in preventing the occurrence of such red streaks.

3. Processed Product

The processed product that can be obtained by the production method of the present invention described above is excellent in thermal stability and heat resistance, and has a good color tone and transparency. The processed product also has various excellent properties derived from the chlorine-containing resin. The processed product may be in any form, such as sheet, film, string, plate, bar, pellet, or tube form. Specific preferred examples of the processed product include various films such as agricultural films, electric wires, pipes, and resin window frames.

EXAMPLES

The present invention is described in detail with reference to examples below, but the present invention is not limited to these examples.

1. Raw Materials

Raw materials in Tables 1 to 3 (described later) are as follows.

(1) Chlorine-Containing Resin
   Vinyl chloride resin: TK-1000 available from Shin-Etsu Chemical Co., Ltd., polymerization degree: 1100

(2) Hydrotalcite Powder
   HT-1: composition formula: $Mg_4Al_2(OH)_{12}.CO_3.3H_2O$, STABIACE HT-1 available from Sakai Chemical Industry Co., Ltd., oil absorption: 55 ml/100 g
   HT-7: composition formula: $Mg_{3.5}Zn_{0.5}Al_2(OH)_{12}.CO_3.3H_2O$, STABIACE HT-7 available from Sakai Chemical Industry Co., Ltd., oil absorption: 40 ml/100 g (3) Silicone Oil
   Silicone oil: KF-96H-10000 CS available from Shin-Etsu Chemical Co., Ltd.

(4) Liquid Fatty Acid
   Ricinoleic acid: ricinoleic acid available from Kokura Synthetic Industries, Ltd.
   Isostearic acid: PRISORINE 3503 available from Croda
   Oleic acid: PM810 available from Miyoshi Oil & Fat Co., Ltd.

(5) Organic Acid Zinc
   Zinc stearate: SZ-P available from Sakai Chemical Industry Co., Ltd.

(6) Additional Components
   Calcium carbonate: p-Powder 3S available from Shiraishi Calcium Kaisha, Ltd., specific surface area: 8.5 $m^2/g$
   Dibenzoylmethane: β-diketone compound, Rhodiastab 83P, available from Rhodia Chimie SAS
   Polyethylene wax: HI-WAX 220MP available from Mitsui Chemicals, Inc.
   Ester wax: Rikester SL-02 available from Riken Vitamin Co., Ltd. Calcium stearate: SC-P available from Sakai Chemical Industry Co., Ltd.
   Dipentaerythritol: Dipentarit 300 available from Koei Chemical Co., Ltd.

2. Mixing with Silicone Oil or Liquid Fatty Acid (Step (I))

The hydrotalcite powder (HT-1 or HT-7) was fed into a 20-L Henschel mixer (Nippon Coke & Engineering Company, Limited). Subsequently, the silicone oil or liquid fatty acid in a predetermined amount was added to the rotating mixer. After the silicone oil or liquid fatty acid was added, the mixture was stirred at 1800 rpm for three minutes. Then, the mixture was extracted. The oil absorption and the bulk density of each mixture were measured by the above-described methods. For example, in the case of Mixture 2, 50 g of the silicon oil was added to 1 kg of the hydrotalcite powder, and the mixture was stirred at 1800 rpm for three minutes. Then, the mixture was extracted. Table 1 shows the results. "Mixture 1" in Table 1 is the hydrotalcite powder HT-1 itself (i.e., the mixture does not contain the silicone oil or the liquid fatty acid), but it is described as "Mixture 1" for convenience sake.

TABLE 1

|  | Raw material | | | | Oil absorption (ml/100 g) | Bulk density (g/ml) |
|---|---|---|---|---|---|---|
|  | Hydrotalcite powder | Silicone oil Amount *1 | Liquid fatty acid Type | Amount *1 | | |
| Name Mixture 1 | HT-1 | — | — | — | 55 | 0.31 |
| Mixture 2 | HT-1 | 5 | — | — | 47 | 0.31 |
| Mixture 3 | HT-1 | 10 | — | — | 42 | 0.33 |
| Mixture 4 | HT-1 | 20 | — | — | 33 | 0.43 |
| Mixture 5 | HT-1 | 30 | — | — | 21 | 0.74 |
| Mixture 6 | HT-7 | 10 | — | — | 25 | 0.38 |
| Mixture 7 | HT-1 | — | Ricinoleic acid | 10 | 41 | 0.42 |
| Mixture 8 | HT-1 | — | Ricinoleic acid | 20 | 32 | 0.51 |
| Mixture 9 | HT-1 | — | Isostearic acid | 10 | 43 | 0.41 |
| Mixture 10 | HT-1 | — | Oleic acid | 10 | 41 | 0.41 |

*1: Amount of each component relative to 100 parts by mass of hydrotalcite powder (unit: parts by mass).

3. Preparation of Resin Composition (Step (II))

Other materials were weighed in ratios shown in Tables 2 and 3 relative to 3 kg of the chlorine-containing resin. The weighed materials were mixed using a 20-L Henschel mixer (Nippon Coke & Engineering, Co., Ltd.) until the temperature of the mixture reached 100° C. Thus, a resin composition was prepared.

For example, in Test Example A1, 3 kg of vinyl chloride resin, 30 g of Mixture 2 obtained in 2 above, 150 g of calcium carbonate, 15 g of calcium stearate, 30 g of zinc stearate, 15 g of dipentaerythritol, 15 g of dibenzoylmethane, 15 g of polyethylene wax, and 15 g of ester wax were weighed and fed into a Henschel mixer. These components were mixed at a Henschel mixer blade rotation speed of 2000 rpm. When the temperature of the mixture reached 100° C., the mixture was taken out from the Henschel mixer.

In Test Example A9, step (I) was not performed, and only step (II) was performed. Specifically, the hydrotalcite powder, the silicone oil, the organic acid zinc, and the additional additives were weighed according to the ratio shown in Table 2 relative to the amount of the chlorine-containing resin, and these components were mixed as described above. Thus, a resin composition was prepared. Here, the amount of the silicone oil was 10 parts by mass relative to 100 parts by mass of the hydrotalcite powder HT-1 (i.e., "Mixture 1").

4. Processing (Processing Step)

The resin composition was processed in a lab extruder (conical twin-screw "2D20C" available from Toyo Seiki Seisaku-sho, Ltd.; extrusion conditions: 175° C. for C1, 180° C. for C2, 185° C. for C3, 185° C. for AD, 180° C. for D1, and 205° C. for D2; die: for pipes) including a suction cooling device with cooling function (a device that smoothens the surface of an article) for five hours. Thus, pipes were obtained.

5. Evaluation Tests

In each test example, various physical properties and the like were evaluated by the following methods. Tables 2 and 3 show the results.

(1) Plate-Out

During and after processing of the pipes in "4. Processing" above, the occurrence of plate-out on the die and the cooling mold (i.e., the occurrence of deposit on the die and the cooling mold) was visually observed and evaluated based on the following criteria.

AA: No deposit was found on the die or the cooling mold.
A: No deposit was found during processing, but a small amount of deposit was found on the die and the cooling mold after processing.
B: Deposit was found on the die and the cooling mold during processing, but the resulting pipe had no defects.
F: Deposit was found on the entire die surface and the entire cooling mold surface during processing, and the deposit separated from the die or the cooling mold was attached to the resulting pipe.

(2) Processed Product Surface

The occurrence of streaks on the surface of each pipe obtained in "4. Processing" above was visually observed, and evaluated based on the following criteria.

AA: No streaks were found, and the appearance of the surface was good.
A: A few streaks were found, but the appearance of the surface was generally good.
B: Shallow streaks were found, but they were within the tolerable range.
F: Deep streaks were found, or many streaks were found.

(3) Heat Resistance (Even Heat Resistance and Press Heat Resistance)

The pipe (100 g) obtained in "4. Processing" above was crushed by a crusher, and the crushed pieces were kneaded for five minutes using an 8-inch roller (Kansai Roll Co., Ltd.) having a roll surface temperature of 180° C. Thus, a 0.3-mm-thick sheet was produced. The sheet was subjected to the following tests.

(3-1) Oven Heat Resistance

The sheet produced above was placed in a 180° C. gear oven available from ESPEC CORP. and stored therein for 30 minutes and 50 minutes. The hue of the sheet before and after storage was measured by a colorimeter (simultaneous photometric and spectroscopic colorimeter "SQ-2000" available from Nippon Denshoku Industries, Co., Ltd.) to determine the ΔE.

If the ΔE is 15 or less at minute 30 of storage, the color tone is considered to be good, and problems are less likely to occur. If the ΔE is more than 15, trouble such as malfunction of a processing machine or the like may occur.

(3-2) Press Heat Resistance (Press Colorability)

A stack of 13 sheets was prepared and pressed at 100 kg/cm2 for 20 minutes and 30 minutes to obtain a 3-mm-thick sheet, using a pressing machine (Toyoseiki Mini Test Press-10) having a press surface temperature of 190° C. The color difference of the sheet before and after pressing was measured by the colorimeter described above to determine the ΔE based on the following criteria.

If the ΔE is 10 or less at minute 20 of storage, the color tone is considered to be good, and problems are less likely to occur. If the ΔE is more than 10, trouble such as malfunction of a processing machine or the like may occur.

TABLE 2

Unit: parts by mass

|  |  | Test Example A1 | Test Example A2 | Test Example A3 | Test Example A4 | Test Example A5 | Test Example A6 | Test Example A7 | Test Example A8 | Test Example A9 |
|---|---|---|---|---|---|---|---|---|---|---|
| Chlorine-containing resin | TK-1000 | 100 | 100 | 100 | 100 | 100 | 100 | 100 | 100 | 100 |
| Mixture obtained in step (i) | Mixture 1 | — | — | — | — | — | — | — | 1 | 1 |
|  | Mixture 2 | 1 | — | — | — | — | — | — | — | — |
|  | Mixture 3 | — | 1 | — | — | — | — | — | — | — |
|  | Mixture 4 | — | — | 1 | — | 1.2 | — | — | — | — |
|  | Mixture 5 | — | — | — | 1 | — | 1.3 | — | — | — |
|  | Mixture 6 | — | — | — | — | — | — | 1 | — | — |
|  | Silicone oil | — | — | — | — | — | — | — | — | 0.1 |
| Organic acid zinc | Zinc stearate | 1 | 1 | 1 | 1 | 1 | 1 | 1 | 1 | 1 |
| Additional components | Calcium carbonate | 5 | 5 | 5 | 5 | 5 | 5 | 5 | 5 | 5 |
|  | Calcium stearate | 0.5 | 0.5 | 0.5 | 0.5 | 0.5 | 0.5 | 0.5 | 0.5 | 0.5 |
|  | Dipentaerythritol | 0.5 | 0.5 | 0.5 | 0.5 | 0.5 | 0.5 | 0.5 | 0.5 | 0.5 |
|  | Dibenzoylmethane | 0.5 | 0.5 | 0.5 | 0.5 | 0.5 | 0.5 | 0.5 | 0.5 | 0.5 |
|  | Polyethylene wax | 0.5 | 0.5 | 0.5 | 0.5 | 0.5 | 0.5 | 0.5 | 0.5 | 0.5 |
|  | Ester wax | 0.5 | 0.5 | 0.5 | 0.5 | 0.5 | 0.5 | 0.5 | 0.5 | 0.5 |
| Extrusion evaluation | Plate-out evaluation | B | A | AA | AA | AA | AA | A | F | F |
|  | Surface evaluation | B | A | AA | AA | AA | AA | AA | F | F |
| Heat resistance | Oven heat resistance evaluation ($\Delta E$) | 13 | 11 | 10 | 13 | 9 | 10 | 8 | 17 | 17 |
|  | Press colorability evaluation ($\Delta E$) | 9 | 9 | 8 | 5 | 9 | 6 | 6 | 17 | 17 |

TABLE 3

Unit: parts by mass

|  |  | Text Example B1 | Text Example B2 | Text Example B3 | Text Example B4 |
|---|---|---|---|---|---|
| Chlorine-containing resin | TK-1000 | 100 | 100 | 100 | 100 |
| Mixture obtained in step (I) | Mixture 7 | 1 | — | — | — |
|  | Mixture 8 | — | 1 | — | — |
|  | Mixture 9 | — | — | 1 | — |
|  | Mixture 10 | — | — | — | 1 |
| Organic acid zinc | Zinc stearate | 1 | 1 | 1 | 1 |
| Additional components | Calcium carbonate | 5 | 5 | 5 | 5 |
|  | Calcium stearate | 0.5 | 0.5 | 0.5 | 0.5 |
|  | Dipentaerythritol | 0.5 | 0.5 | 0.5 | 0.5 |
|  | Dibenzoylmethane | 0.5 | 0.5 | 0.5 | 0.5 |
|  | Polyethylene wax | 0.5 | 0.5 | 0.5 | 0.5 |
|  | Ester wax | 0.5 | 0.5 | 0.5 | 0.5 |
| Extrusion evaluation | Plate-out evaluation | AA | AA | A | A |
|  | Surface evaluation | AA | AA | A | A |
| Heat resistance | Oven heat resistance evaluation ($\Delta E$) | 11 | 10 | 12 | 12 |
|  | Press colorability evaluation ($\Delta E$) | 9 | 8 | 10 | 10 |

The results of all the test examples show that when the processing step is performed with the resin composition obtained by preliminarily dry-mixing a silicone oil and/or a specific liquid fatty acid with a hydrotalcite powder and then mixing the mixture with the chlorine-containing resin, it is possible to sufficiently prevent the occurrence of plate-out during processing and the time-dependent increase in the amount of deposit, and it is possible to obtain a processed product excellent in thermal stability and heat resistance and having a good color tone and transparency. In this regard, for example, Test Examples A1 to A7 and B1 to B4 are different from Test Example A8 mainly in whether or not the silicone oil and/or the liquid fatty acid was preliminarily mixed with the hydrotalcite powder. In Test Example A8 in which the silicone oil and/or the liquid fatty acid was not added, the results of the plate-out evaluation, the surface evaluation, and the heat resistance evaluation are all significantly poor (see Tables 2 and 3). In contrast, in Test Examples A1 to A7 in which the silicone oil was preliminarily mixed with the hydrotalcite powder and Test Examples B1 to B4 in which the liquid fatty acid was preliminarily mixed with the hydrotalcite powder, the results are good. The cause is unknown, but the poor result is presumably attributable to the fact that the lubricant that has dissolved and became liquid during processing was not easily absorbed into the hydrotalcite powder. Although the plate-out evaluation results of Test Example A2 and Test Example A7 are the same based on the evaluation criteria described above, the result is actually slightly better in Test Example A7. Thus, Test Example A7 has a better result in the surface evaluation.

In Test Example A9, step (I) was not performed, and a hydrotalcite powder, a silicone oil, organic acid zinc, and additional additives were added to and mixed with a chlorine-containing resin in step (II). The resulting mixture corresponds to Mixture 3 in terms of the amount of the silicone oil relative to the hydrotalcite powder, but the mixture shows no improvement in plate-out (see Table 2). This shows that it is necessary to preliminarily perform step (I) of mixing a silicone oil and/or a liquid fatty acid with a hydrotalcite powder.

In each of Test Examples A3, B1, B3, and B4, the component (silicone oil or liquid fatty acid) to be preliminarily mixed with the hydrotalcite powder was different, but the amount of the component (10 parts by mass relative to 100 parts by mass of the hydrotalcite powder) and other conditions were the same. A comparison of various evaluation results based on the difference shows that use of ricinoleic acid results in the best performance in the plate-out evaluation, the oven heat resistance evaluation, and the press colorability evaluation (see Tables 2 and 3).

The invention claimed is:

1. A method for producing a chlorine-containing resin composition, comprising:
   (I) dry-mixing a silicone oil, or a liquid fatty acid having a C12 or higher carbon chain, or a combination thereof, with a hydrotalcite powder so as to obtain a mixture; and
   (II) mixing a chlorine-containing resin with the mixture, wherein the mixture obtained in the dry-mixing (I) has an oil absorption of 50 ml/100 g or less, and the mixture obtained in the dry-mixing (I) has a bulk density in a range of 0.35 g/ml or more.

2. The method according to claim 1,
   wherein in the dry-mixing (I), an amount of the silicone oil, and/or the liquid fatty acid, or a combination thereof, or a total amount when two or more silicone oils, or two or more liquid fatty acids, or combinations thereof are used, is in a range of 1 to 30 parts by mass relative to 100 parts by mass of the hydrotalcite powder.

3. The method according to claim 1,
   wherein the hydrotalcite powder comprises: magnesium (Mg), or zinc (Zn), or a combination thereof and aluminum (Al).

4. The method according to claim 1, wherein the chlorine-containing resin is a vinyl chloride resin.

5. The method according to claim 1, wherein the mixture obtained in (I) has a bulk density in a range of 0.35 g/ml to 0.74 g/ml.

6. A method for producing a product from a chlorine-containing resin composition, comprising:
   processing the chlorine-containing resin composition obtained by the method according to claim 1.

7. The method according to claim 6,
   wherein the processing comprises extrusion.

* * * * *